US008334632B2

(12) United States Patent
Kondou et al.

(10) Patent No.: US 8,334,632 B2
(45) Date of Patent: Dec. 18, 2012

(54) STATOR FOR A ROTATING ELECTRIC MACHINE AND ROTATING ELECTRIC MACHINE

(75) Inventors: Keiji Kondou, Toyota (JP); Makoto Taniguchi, Obu (JP); Takeo Maekawa, Okazaki (JP); Akira Fukushima, Kariya (JP); Akito Akimoto, Kariya (JP); Shin Kusase, Obu (JP); Yuya Mizuma, Gamagori (JP)

(73) Assignee: Denso Corporation, Kariya (JP)

( * ) Notice: Subject to any disclaimer, the term of this patent is extended or adjusted under 35 U.S.C. 154(b) by 136 days.

(21) Appl. No.: 12/916,861

(22) Filed: Nov. 1, 2010

(65) Prior Publication Data

US 2011/0101816 A1    May 5, 2011

(30) Foreign Application Priority Data

Oct. 30, 2009    (JP) .................................. 2009-250424

(51) Int. Cl.
*H02K 1/06*    (2006.01)
(52) U.S. Cl. ... 310/216.079; 310/216.086; 310/216.094; 310/216.098
(58) Field of Classification Search ........... 310/216.069, 310/216.086, 216.093, 216.94, 216.098, 310/216.079
See application file for complete search history.

(56) References Cited

U.S. PATENT DOCUMENTS 3,849,683 A * 11/1974 Leistner ................. 310/216.086

FOREIGN PATENT DOCUMENTS

| JP | 07059278 A | * | 3/1995 |
| JP | 7-111746 | | 4/1995 |
| JP | 07111746 A | * | 4/1995 |
| JP | 10-234159 | | 9/1998 |

OTHER PUBLICATIONS

Machine Translation JP07111746 (1995) JP07059278 (1995).*

* cited by examiner

*Primary Examiner* — Quyen Leung
*Assistant Examiner* — Jose Gonzalez Quinones
(74) *Attorney, Agent, or Firm* — Nixon & Vanderhye, PC

(57) ABSTRACT

A stator includes a stator-core having slots and teeth, and a back-yoke having convex and concave portions. The convex portions are partially inserted into the slots, and the concave portions receive the teeth. The teeth include tip portions whose circumferential widths become larger along a radial direction from the inside to the outside of the stator. The back-yoke includes convex portions whose circumferential widths become larger along the radial direction from the outside to the inside of the stator. The tip portions and the convex portions have substantially the same shape. The length of a joint portion between the tip portion and the convex portion, the circumferential width of the tooth corresponding to a tip surface of the convex portion, the width of a root portion of the tooth, and the circumferential width of the convex portion corresponding to a bottom face of the concave portion are substantially the same.

4 Claims, 8 Drawing Sheets

STATOR FOR A ROTATING ELECTRIC MACHINE AND ROTATING ELECTRIC MACHINE

CROSS-REFERENCE TO RELATED APPLICATION

This application is based on and claims the benefit of priority from earlier Japanese Patent Application No. 2009-250424 filed Oct. 30, 2009, the description of which is incorporated herein by reference.

BACKGROUND OF THE INVENTION

1. Technical Field of the Invention

The present invention relates to a stator for a rotating electric machine having a stator core and a back yoke, and a rotating electric machine having the stator.

2. Related Art

A technique for assembling a core of a rotating electric machine is disclosed in, for example, JP-A-H10-234159. According to the technique, coils (i.e. windings) are wound through stator slots of a stator teeth core, then stator latching portions of the stator teeth core are fit to spaces formed in a stator core-back core.

According to another technique disclosed in, for example, JP-A-H07-111746, coils are inserted in an inner-circumference-side stator core, which has slots whose outer-circumference-side ends are opened, from the outer-circumference side of the stator core and are wound, then an outer-circumference-side stator core (i.e. back yoke) is fixed to the inner-circumference-side stator core.

SUMMARY

An embodiment provides a stator for a rotating electric machine and a rotating electric machine having the stator, which have excellent magnetic properties due to the engagement between teeth and a back yoke.

As an aspect of the embodiment, the stator for a rotating electric machine includes: a stator core including a plurality of slots, through which coils are wound, and a plurality of teeth, whose root portions are connected with a bridge, the slots and the teeth being alternately arranged; and a back yoke which is arranged at the outer-circumference side of the stator core, and which includes convex portions and the concave portions at the inner-circumference side thereof, the convex portions being partially inserted into the slots, and the concave portions receiving the teeth, wherein the teeth include tip portions whose circumferential widths gradually become larger along a radial direction from the inside of the stator to the outside of the stator, the back yoke includes convex portions whose circumferential widths gradually become larger along the radial direction from the outside of the stator to the inside of the stator, and the tip portions and the convex portions have substantially the same shape so as to engage with each other, and the length of a joint portion at which the tip portion and the convex portion are joined to each other, the circumferential width of the tooth corresponding to a tip surface of the convex portion, the width of the root portion of the tooth, and the circumferential width of the convex portion corresponding to a bottom face of the concave portion are substantially the same.

DETAILED DESCRIPTION OF THE PREFERRED EMBODIMENTS

Hereinafter, embodiments of the present invention will be described in connection with the accompanying drawings. In the embodiments set forth below, the components identical with or similar to each other are given the same reference numerals for the sake of omitting redundant explanation.

Figure 1:
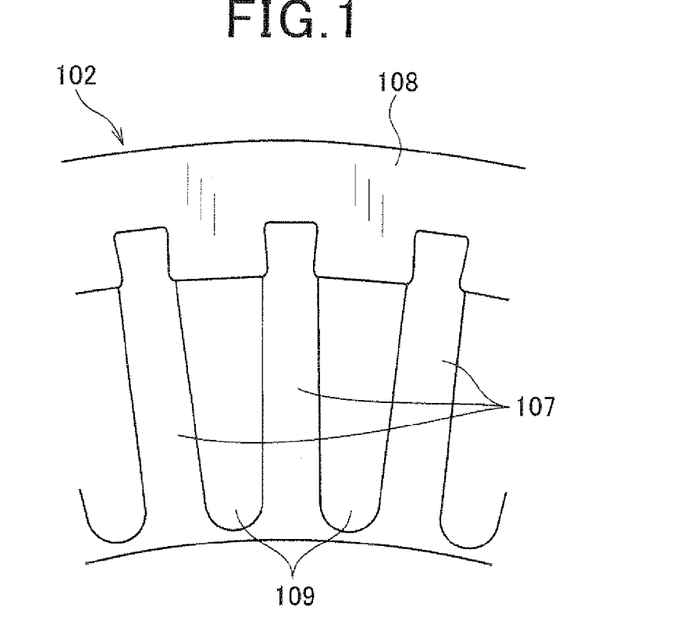
FIG. 1 is a partial enlarged view showing a conventional stator.
Figure 2:
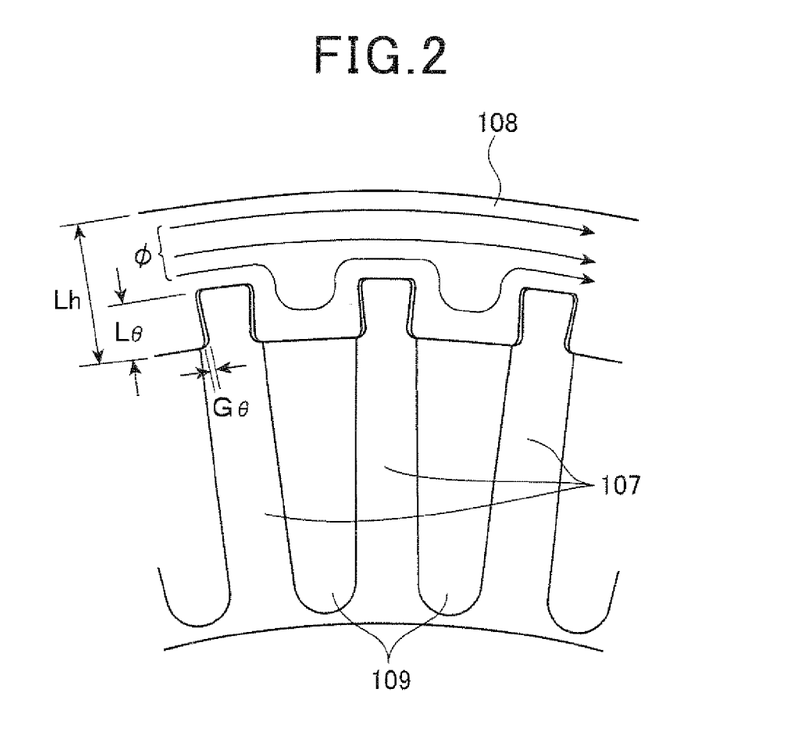
FIG. 2 is a diagram showing gaps provided in the circumferential direction.
Figure 3:
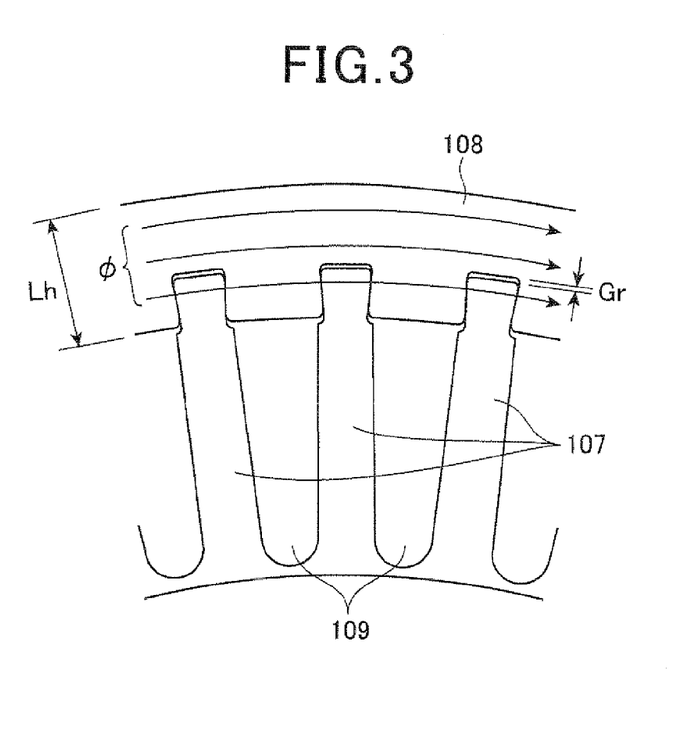
FIG. 3 is a diagram showing gaps provided in the radial direction.
Figure 4:
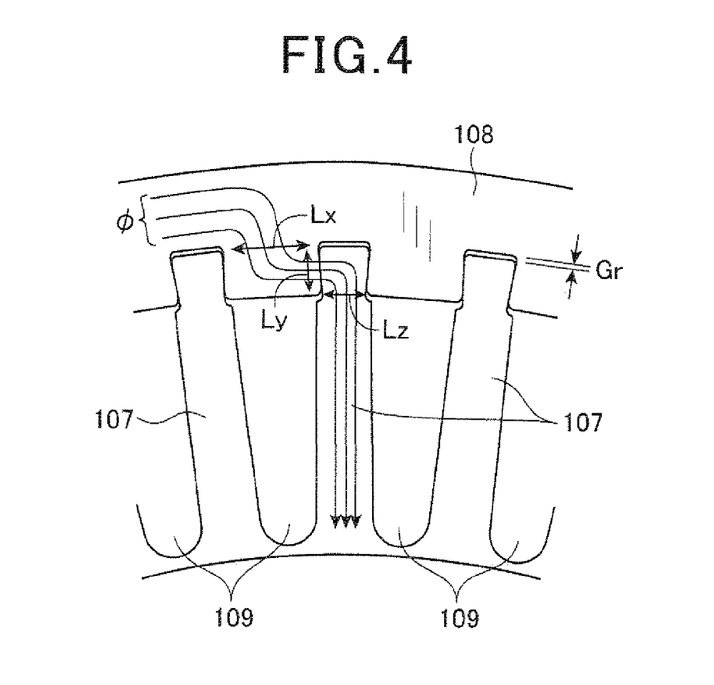
FIG. 4 is a diagram for explaining variation in cross sections of a flux path.

FIG. 1 is a partial enlarged view showing a conventional stator. FIG. 1 shows an ideal state of a stator 102 in which teeth 107 and a back yoke 108 are engaged with each other. Precisely forming the teeth 107 and the yoke 108 is difficult in practice. When considering assembly performance, one option is, as shown in FIG. 2, providing gaps Gθ in the circumferential direction between the teeth 107 and the yoke 108, and another option is, as shown in FIG. 3, providing gaps Gr in the radial direction between the teeth 107 and the yoke 108. When the gaps Gθ are provided as shown in FIG. 2, a magnetic flux does not flow in areas of a radial-direction width Lθ corresponding to the gap Gθ, thereby degrading the magnetic property. In order to suppress the degradation of the magnetic property, it is preferable to provide gaps Gr shown in FIG. 3 by which the width suppressing the flow of the magnetic flux is reduced. When the gaps Gr are provided, the degradation of the magnetic property is suppressed, but cross sections of a flux path corresponding to engagement portions between the teeth 107 and the yoke 108 may vary. For example, as shown in FIG. 4, the width Lx of a root of a convex portion of the back yoke 108, the width Ly of a joint surface between the tooth 107 and the yoke 108, and the width Lz of a root of a tip portion of the tooth 107 has a relationship of $Lx \neq Ly \neq Lz$. According to the above structure, magnetic saturation occurs at a portion having the smallest width, thereby degrading the magnetic property. Although not shown, the magnetic property is degraded as well when magnetic saturation occurs at other portions due to needless cross sections of the magnetic path.

Figure 5:
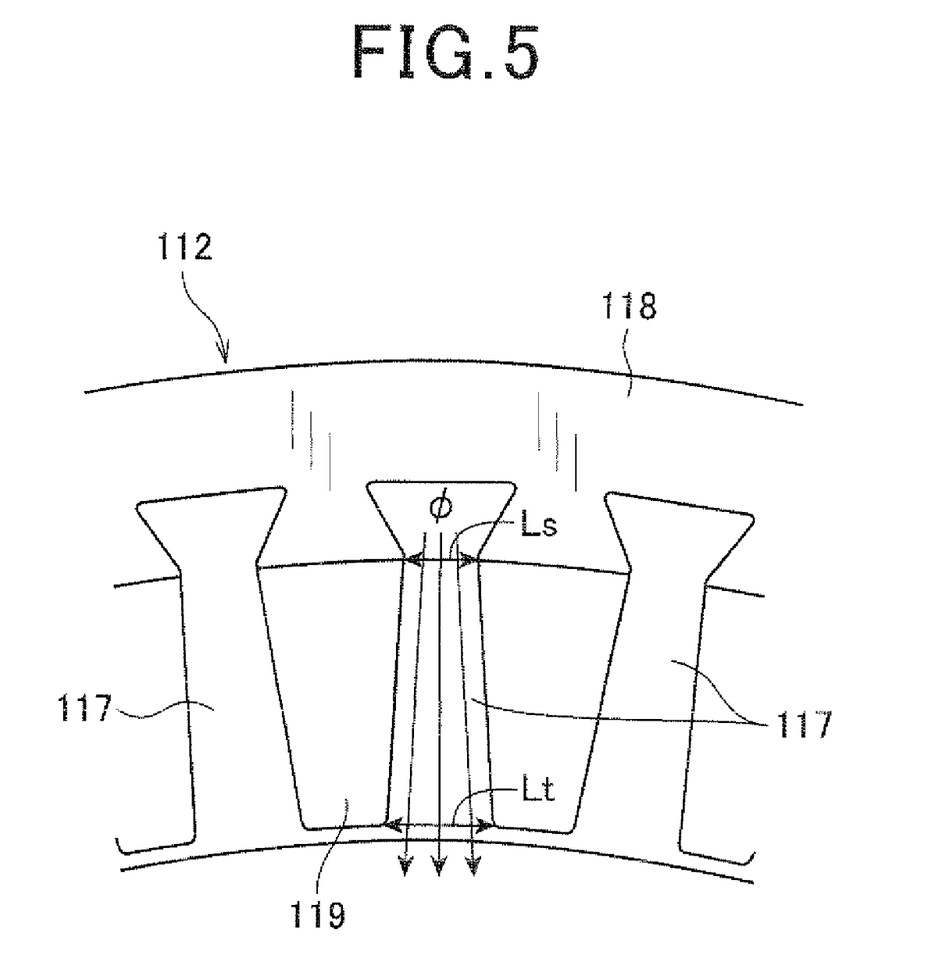
FIG. 5 is a partial enlarged view showing a conventional stator.

FIG. 5 is a partial enlarged view showing another conventional stator. FIG. 5 shows a stator 112 in which teeth 117 and a back yoke 118 are engaged with each other. Both the teeth 117 and the back yoke 118 have dovetail shapes (in which the circumferential width increases from the bottom portion to the tip portion). Specifically, the dovetail portion of the end portion of the tooth 117 has a root portion having the extremely small width Ls. In contrast, the tip portion of the dovetail portion has an extremely wide shape. The width Lt of the root portion of the tooth 117 is larger than the width Ls, i.e. Lt>Ls. According to the above structure, magnetic saturation occurs at the root portion of the dovetail portion having the extremely small width, which can degrade the magnetic property.

Figure 6:
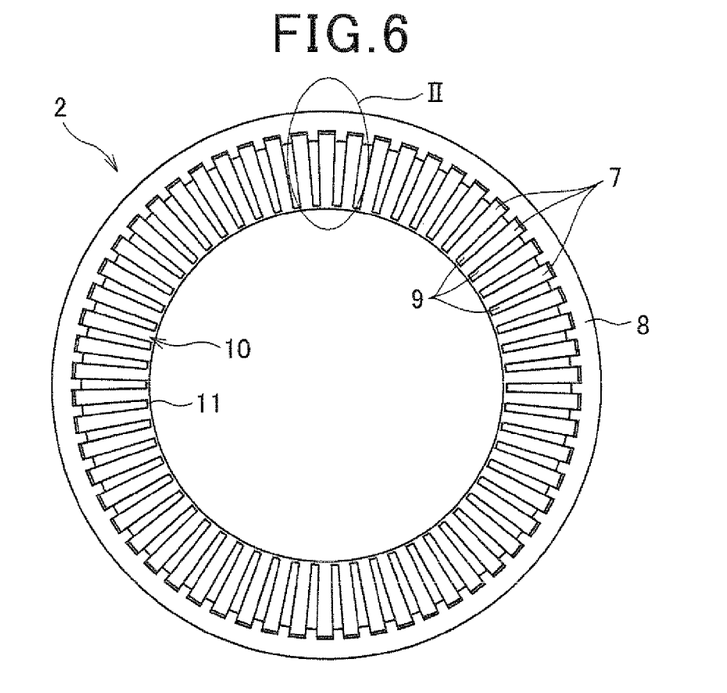
FIG. 6 is a general view of a stator according to an embodiment.
Figure 7:
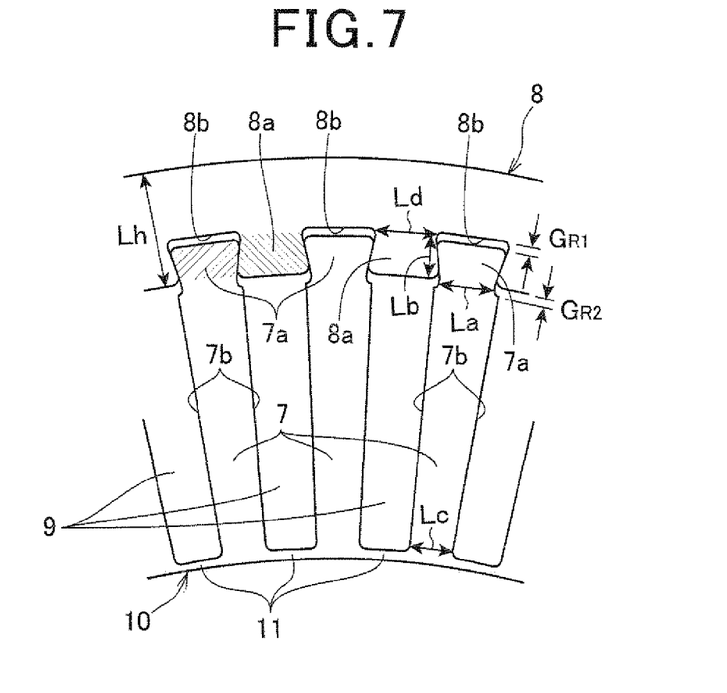
FIG. 7 is a partial enlarged view schematically showing an example of a configuration of the stator.

FIG. 6 is a general view of a stator according to an embodiment of the present invention. FIG. 7 is a schematic view showing a portion marked II in FIG. 6 in an enlarged scale. A stator 2 shown in FIG. 6 includes a stator core 10, and a back yoke 8 arranged at the outer-circumference side of the stator core 10. As shown in FIG. 7, the stator core 10 is configured by alternately arranging a plurality of slots 9 and a plurality of teeth 7. Coils 4 are wound through the slots 9 (refer to FIG. 13 described later). The shape of the core and the way of winding the coil are described later. Root portions of the teeth 7 are connected with a bridge 11, thereby forming a ring shape. The back yoke 8 is formed so as to correspond to concavoconvex shapes of the slots 9 and teeth 7 configuring the stator core 10. That is, the back yoke 8 has convex portions 8a and concave portions 8b at the inner-circumference side thereof. The convex portions 8a are partially inserted into the slots 9. The concave portions 8b receive the teeth 7. The convex portions 8a are formed so that the circumferential widths thereof gradually become larger along the radial direction from the outside of the stator 2 to the inside of the stator 2. Tip portions 7a of the teeth 7 are formed so that the circumferential widths thereof gradually become larger along the radial direction from the inside of the stator 2 to the outside of the stator 2. The slots 9 are formed to be a tapered shape so that the widths thereof gradually become larger along the radial direction from the inside of the stator 2 to the outside of the stator 2.

The tip portions 7a of the teeth 7 and the convex portions 8a of the back yoke 8 are formed so as to be engaged with each other when the stator 2 is configured. Specifically, the shape of the tip portion 7a and the shape of the convex portion 8a are the same. As a result, physical conditions (such as a cross-sectional area and a cross-sectional shape) of the tip portions 7a and those of the convex portions 8a also become the same.

In addition, the length Lb (hereinafter, referred to as "joint portion width") of a joint portion at which the tip portion 7a and the convex portion 8a are joined to each other when the tip portion 7a and the convex portion 8a are engaged with each other, the width La in the circumferential direction (hereinafter, referred to as "circumferential width") of the tooth 7 corresponding to a tip surface of the convex portion 8a, the width Lc of the root portion (hereinafter, referred to as "root portion width") of the tooth 7, and the width Ld in the circumferential direction (hereinafter, referred to as "circumferential width") of the convex portion 8a corresponding to a bottom face of the concave portion 8b are substantially the same, that is, La≈Lb≈Lc≈Ld. Note that the range in which the length and the widths can be assumed as "substantially the same" is described later.

Figure 8:
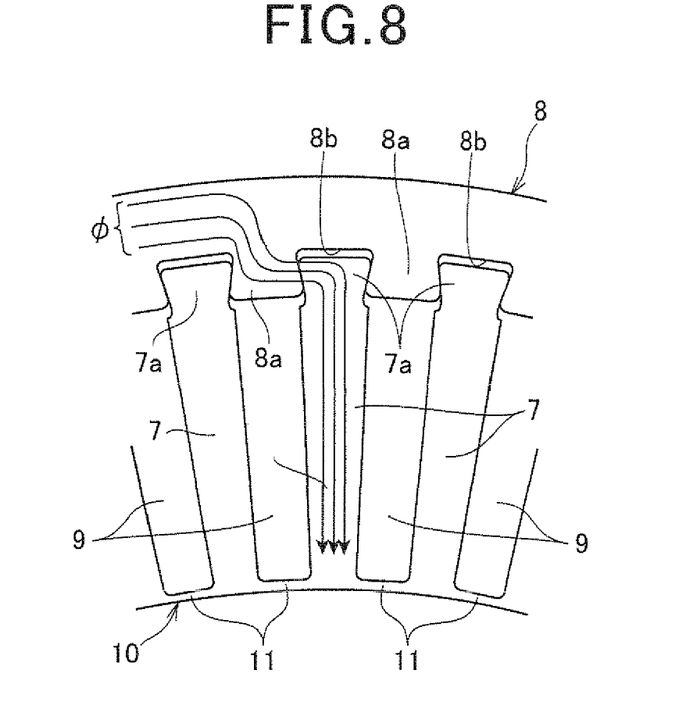
FIG. 8 is a diagram for explaining a flow of a magnetic flux in the stator.

When the joint portion width Lb, the circumferential width La, the root portion width Lc, and the circumferential width Ld are the same as described above, a magnetic flux passing through the stator 2 flows as shown in FIG. 8. Since the lengths of the portions through which the magnetic flux flows are substantially the same, magnetic saturation is suppressed. Thus, the magnetic property of the stator 2 can be improved.

Figure 9:
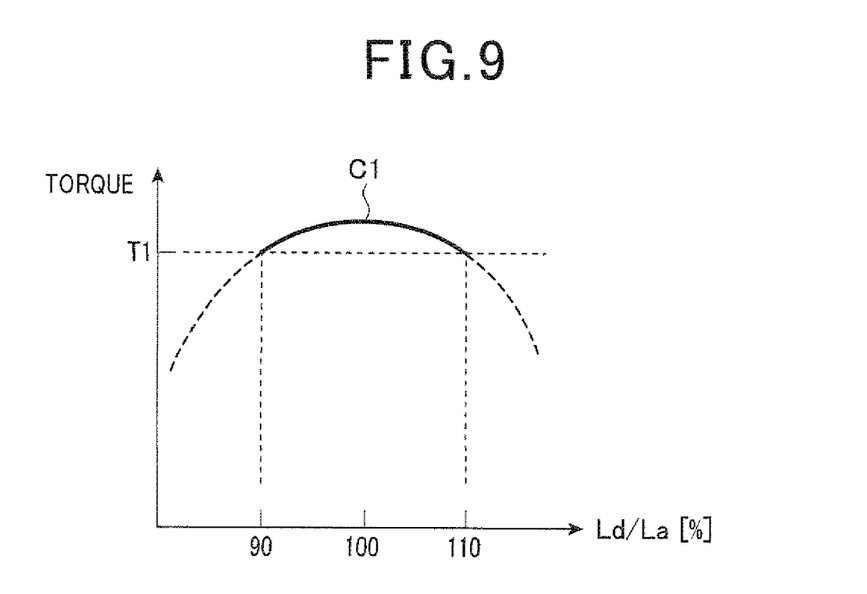
FIG. 9 is a graph showing a relationship between the ratio of widths and torque.
Figure 10:
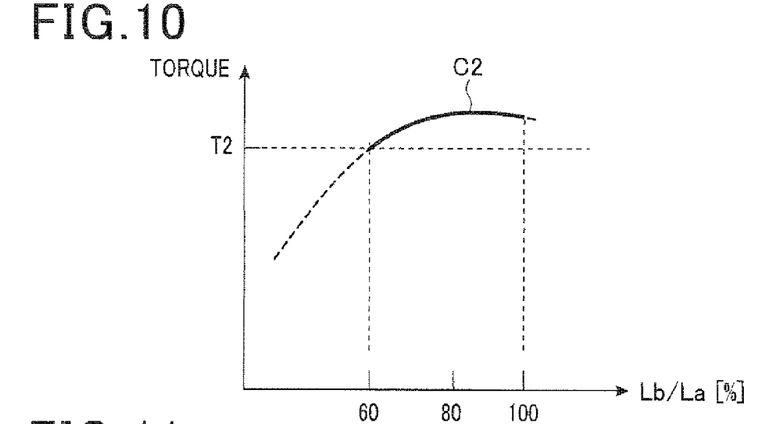
FIG. 10 is a graph showing a relationship between the ratio of widths and torque.
Figure 11:
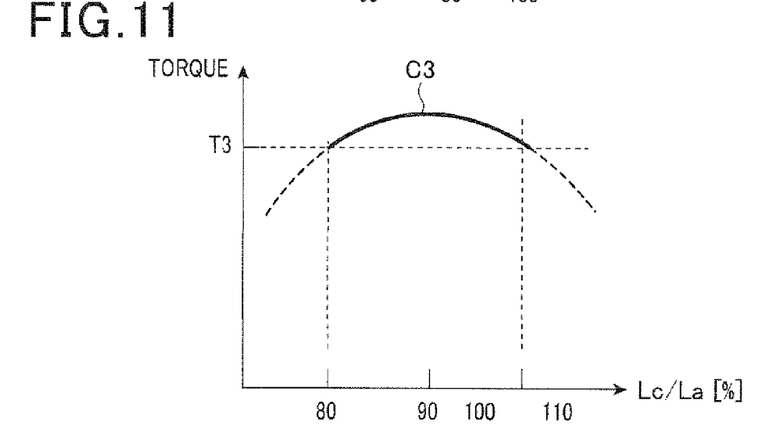
FIG. 11 is a graph showing a relationship between the ratio of widths and torque.

Hereinafter, the range in which the joint portion width Lb, the circumferential width La, the root portion width Lc, and the circumferential width Ld can be assumed to be substantially the same (i.e. La≈Lb≈Lc≈Ld) is described with reference to FIGS. 9 to 11. FIGS. 9 to 11 are graphs showing relationships between ratios of widths and torque. Note that torque T1 to T3 shown in FIGS. 9 to 11 are examples where the stator 2 is incorporated in an electric motor (e.g. a rotating electric machine shown in FIG. 16 described later). Thus, numerical values may be different from those of the graphs depending on materials used for the stator 2, the type of the rotating electric machine, and the like.

In FIG. 9, the circumferential width Ld and the circumferential width La are used. FIG. 9 shows a characteristic line C1. In FIG. 9, the horizontal axis indicates the ratio of widths (Ld/La), and the vertical axis indicates torque. According to the characteristic line C1, torque equal to or more than objective torque T1 is obtained without magnetic saturation when Ld/La is in the range of 90 to 110%.

In FIG. 10, the joint portion width Lb and the circumferential width La are used. FIG. 10 shows a characteristic line C2. In FIG. 10, the horizontal axis indicates the ratio of widths (Lb/La), and the vertical axis indicates torque. According to the characteristic line C2, torque equal to or more than objective torque T2 is obtained without magnetic saturation when Lb/La is in the range of 60 to 100%.

In FIG. 11, the root portion width Lc and the circumferential width La are used. FIG. 11 shows a characteristic line C3. In FIG. 11, the horizontal axis indicates the ratio of widths (Lc/La), and the vertical axis indicates torque. According to the characteristic line C3, torque equal to or more than objective torque T3 is obtained without magnetic saturation when Lc/La is in the range of 80 to 110%.

As shown in FIG. 7, the tip portions 7a of the teeth 7 and the convex portions 8a of the back yoke 8 are engaged with each other when the stator 2 is configured. After the engagement, a first gap $G_{R1}$ and a second gap $G_{R2}$ are generated as shown FIG. 7. The first gap $G_{R1}$ indicates a radial distance between a tip surface of the tooth 7 and a bottom face of the concave portions 8b. The second gap $G_{R2}$ indicates a radial distance between a tip surface of the convex portion 8a and a portion where the circumferential width of the tooth 7 is maximized. In addition, a yoke width Lh indicates the thickness of the back yoke 8. Specifically, the yoke width Lh is a difference value between the inner diameter of the back yoke 8, which is associated with the tip surface of the convex portion 8a, and the outer diameter of the back yoke 8, which is associated with the periphery surface of the back yoke 8.

The stator may be configured so as to have at least one of the first gap $G_{R1}$ and the second gap $G_{R2}$. The first gap $G_{R1}$ ensures a space for receiving the deformed tip portion 7a. The second gap $G_{R2}$ ensures a space for receiving the deformed convex portion 8a. Hence, the stator core 10 can be easily incorporated into the back yoke 8.

Figure 12:
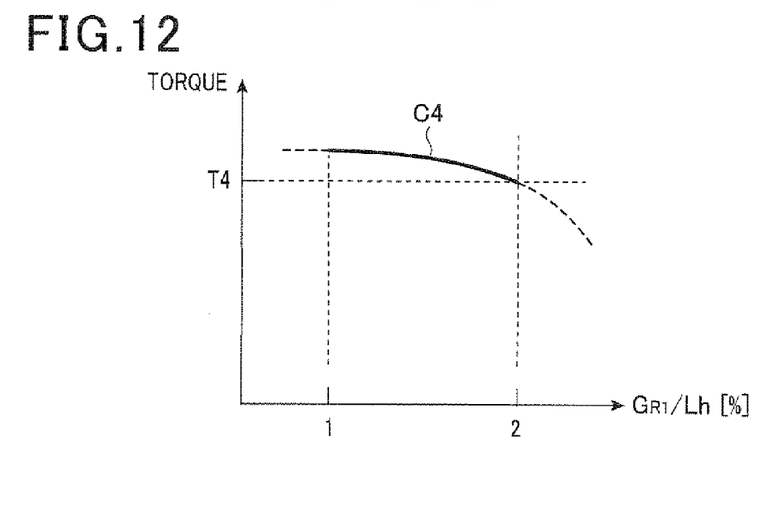
FIG. 12 is a graph showing a relationship between the gap ratio and torque.

When the first gap $G_{R1}$ and the second gap $G_{R2}$ are large with respect to the yoke width Lh, a magnetic flux passing through the back yoke 8 is affected. In order to suppress the effect on the magnetic flux as much as possible, the relationship between the first gap $G_{R1}$ and the yoke width Lh (gap ratio) is required to be defined. FIG. 12 is a graph showing the relationship between the gap ratio and the torque. Note that torque T4 shown in FIG. 12 is an example where the stator 2 is incorporated into an electric motor as in the cases of torque T1 to T3 shown in FIGS. 9 to 11.

In FIG. 12, the first gap $G_{R1}$ and the yoke width Lh are used. FIG. 12 shows a characteristic line C4. In FIG. 12, the horizontal axis indicates the gap ratio ($G_{R1}$/Lh), and the vertical axis indicates torque. According to the characteristic line C4, torque equal to or more than objective torque T4 is obtained without magnetic saturation when $G_{R1}$/Lh is in the range of 1 to 2%.

Figure 13:
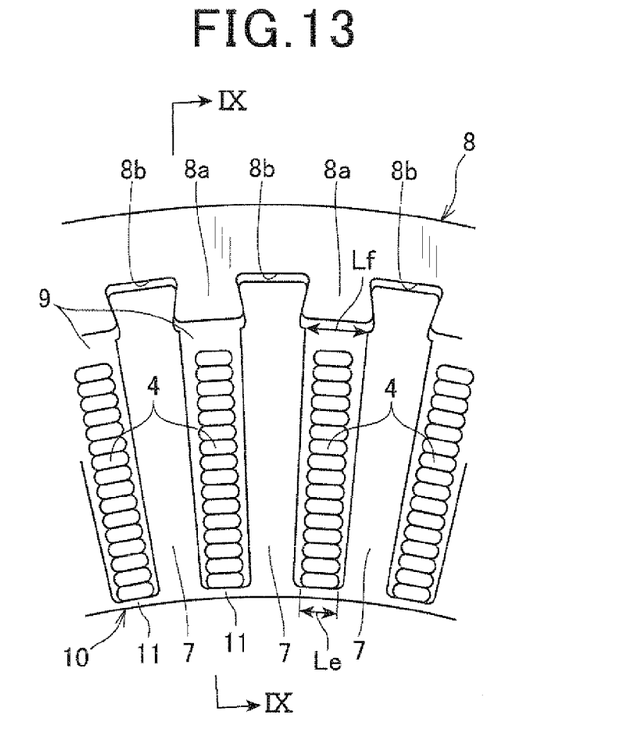
FIG. 13 shows an example of wound coils.
Figure 14:
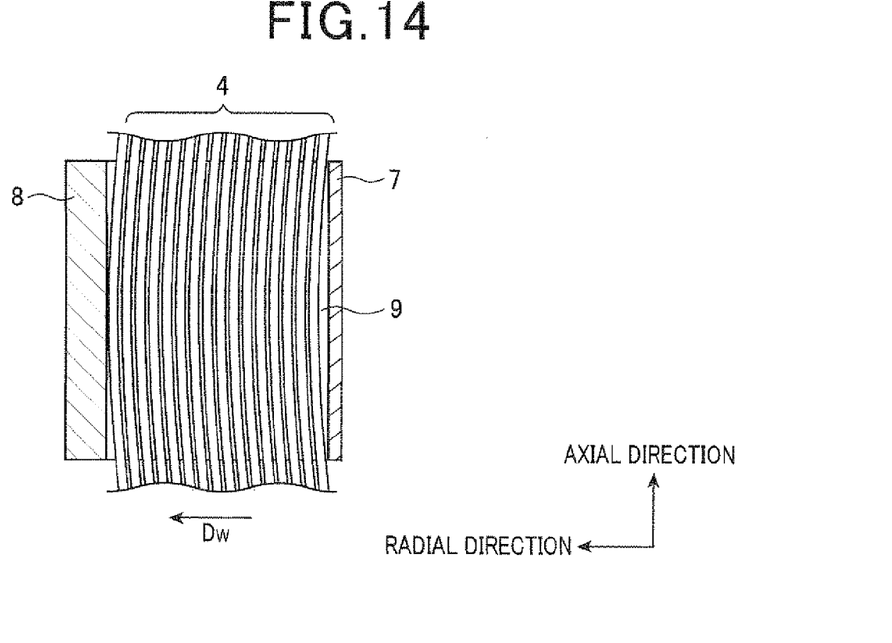
FIG. 14 is a sectional view showing the coil wound through a slot.
Figure 15:
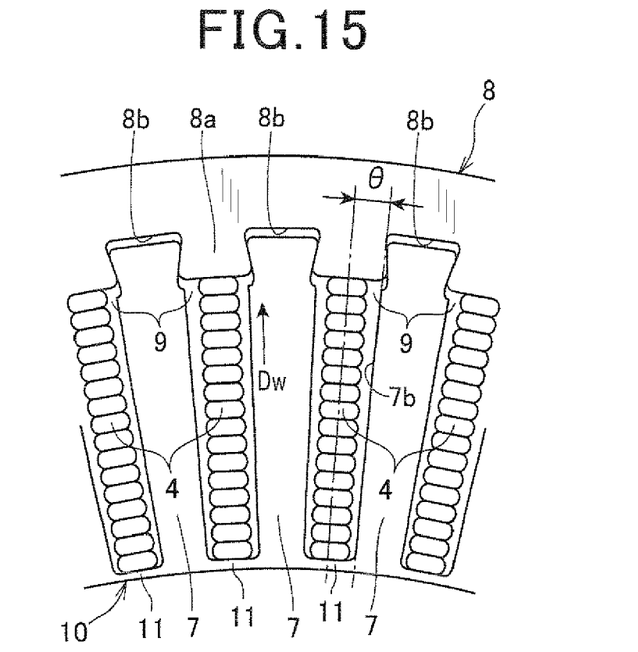
FIG. 15 is a sectional view showing an example of a configuration is of slots.

Next, a method for winding the coils 4 through the slots 9 is described with reference to FIGS. 13 to 15. FIGS. 13 and 14 show an example of the wound coil 4. FIG. 13 is a partial side view of the stator 2. FIG. 14 is a IX-IX sectional view taken in the direction of the arrows of FIG. 13. FIG. 15 is a partial side view of the stator 2 showing an example of a configuration of the slots 9.

As shown FIG. 13, the cross section of the coil 4 has a shape widened and flattened in the circumferential direction. Specifically, the circumferential width Le of the coil 4 is preferably larger than one half of the maximum width Lf of the slot 9. The coil 4 is wound through the slots 9 with aligned-distributed winding. The wound coil 4 is acted on by spring back by which the coil expands due to the restoring force thereof. Since the coil 4 is aligned in the radial direction in line by the aligned-distributed winding, the coil 4 is effectively acted on by the spring back.

Due to the effect of the spring back, as shown in FIGS. 14 and 15, the coils 4 pushes the teeth 7 in the radial direction (the direction opposite to that indicated by an arrow DW) to the inside of the back yoke 8 via the bridge 11. Thus, since the tip portions 7a of the teeth 7 and the convex portions 8a of the back yoke 8 are joined to each other more strongly at the joint surfaces, the magnetic flux 4) flows smoothly, thereby improving the magnetic property.

Since the slots 9 have tapered shapes, as shown in FIG. 15, a center line of the slot 9 (shown by an alternate long and short dash line) and a wall surface 7b of the tooth 7 (shown by a continuous line) form an angle of θ. Due to the angle of θ, the widths of the slots 9 gradually become larger along the radial direction from the inner-circumference side of the stator core 10 to the outer-circumference side of the stator core 10. Thus, when the coil 4 is wound from the outer-circumference side of the stator core 10, the coil 4 can be easily inserted because an opening of the slot 9 is sufficiently wide compared with the circumferential width Le of the coil 4. In addition, since the large is distance between the coil 4 and the wall surface 7b (distance in the circumferential direction) can be ensured, the coil 4 becomes difficult to be jointed to the wall surface 7b. Thus, when the spring back is effected, the coil 4 and the wall surface 7b are prevented from being diminished due to the friction therebetween. Since the effect of the spring back can be maximally utilized, the tip portion 7a and the convex portion 8a are joined to each other more strongly at the joint surface. Thereby, the magnetic flux 4) flows smoothly, improving the magnetic property.

An example of a configuration of a rotating electric machine having the stator 2 will be described with reference to FIG. 16. The rotating electric machine corresponds to, for example, an electric motor. A rotating electric machine M shown in FIG. 16 has not only the stator 2 and the coils 4 but also a frame (housing) 1, a rotor 3, and a shaft (rotating shaft) 5. That is, the frame 1 contains the stator 2 in which the coils 4 are wound and the rotatable (e.g. in the direction indicated by an arrow Dr) shaft 5 around which the rotor 3 is fixed. The stator 2 and the rotor 3 face each other. Energizing the coils 4 wound in the stator 2 generates rotating magnetic fields, which rotates the rotor 3 and the shaft 5. Therefore, the rotating electric machine M having features of the stator 2 can be provided.

According to the above embodiment, following advantages are obtained. In the stator 2 having the stator core 10 and the back yoke 8, the tip portions 7a of the teeth 7 and the convex portions 8a are formed in the substantially same shape. Tip portions 7a are formed so that the circumferential widths thereof gradually become larger along the radial direction from the inside of the stator 2 to the outside of the stator 2. The convex portions 8a are formed so that the circumferential widths thereof gradually become larger along the radial direction from the outside of the stator 2 to the inside of the stator 2. The length (joint portion width Lb) of the joint portion at which the tip portion 7a of the tooth 7 and the convex portion 8a are joined to each other when the tip portion 7a and the convex portion 8a are engaged with each other, the width in the circumferential direction (circumferential width La) of the tooth 7 corresponding to the tip surface of the convex portion 8a, the width (root portion width Lc) of the root portion of the tooth 7, and the width in the circumferential direction (circumferential width Ld) of the convex portion 8a corresponding to the bottom face of the concave portion 8b are substantially the same (refer to FIG. 7, FIGS. 9 to 12). According to the configuration, since the circumferential width La, the joint portion width Lb, the root portion width Lc, and the circumferential width Ld are substantially the same, cross sections of a flux path (i.e. cross-sectional areas, cross-sectional shapes and the like through which the magnetic flux φ flows) are substantially the same. Thus, magnetic saturation on the path of the magnetic flux φ can be suppressed, and a magnetic circuit having no needless magnetic paths (e.g. iron) can be formed, thereby improving the magnetic property (and also driving performance).

In addition, at least one of the first gap $G_{R1}$ and the second gap $G_{R2}$ is generated (refer to FIG. 7). The first gap $G_{R1}$ indicates a radial distance between the tip surface of the tooth 7 and the bottom face of the concave portion 8b. The second gap $G_{R2}$ indicates a radial distance between the tip surface of the convex portion 8a and the portion where the circumferential width of the tooth 7 is maximized. According to the configuration, even when the tip portion 7a of the tooth 7 or the convex portion 8a of the back yoke 8 is deformed when the tip portion 7a and the convex portion 8a are engaged with each other, a space for receiving the tip portion 7a or the convex portion 8a can be ensured. Thereby, the stator core 10 can be easily incorporated. In addition, both the first gap $G_{R1}$ and the second gap $G_{R2}$ are gaps Gr in the radial direction, and are not gaps Gθ in the circumferential direction. Thus, decrease of the cross section of the magnetic path in the back yoke 8 can be suppressed, thereby suppressing the degradation of the magnetic property.

In addition, the coil 4 has a shape widened and flattened in the circumferential direction, and is wound through the slots 9 with aligned-distributed winding (refer to FIG. 13). According to the configuration, the teeth 7 and the back yoke 8 are joined to each other more strongly in the circumferential direction at the joint surface due to the action of the spring back of the coils 4, thereby improving the magnetic property.

In addition, the circumferential width Le of the coil 4 is larger than one half of the maximum width Lf of the slot 9 (refer to FIG. 13). According to the configuration, since the coil 4 is aligned in the radial direction in line, the force of spring back can be efficiently utilized, thereby further improving the magnetic property.

In addition, the slots 9 have tapered shapes in which the widths thereof gradually become larger along the radial direction from the inside of the stator 2 to the outside of the stator 2 (refer FIG. 7, FIG. 15 and the like). According to the configuration, the coil 4 can be easily wound, the friction between the coil 4 and the stator core 10 (specifically, the wall surface 7b of the tooth 7) can be reduced. In addition, since the force of spring back can be efficiently utilized, the magnetic property is further improved.

Figure 16:
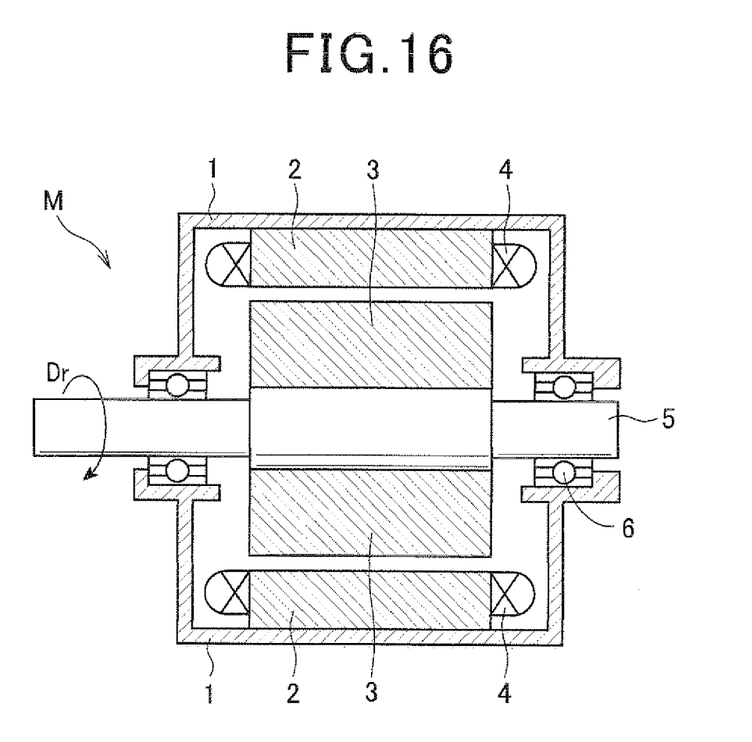
FIG. 16 is a sectional view showing an example of a configuration of a rotating electric machine.

In addition, the rotating electric machine M having the stator 2 is configured (refer to FIG. 16). According to the configuration, the rotating electric machine M can be provided which has excellent magnetic properties due to the engagement between the teeth 7 and the back yoke 8, and in which the teeth 7 can be easily incorporated into the back yoke 8.

[Modifications]

In the above embodiment, the tip portions 7a of the teeth 7 and the convex portions 8a of the back yoke 8 are formed so that the circumferential widths thereof gradually become larger from the bottom portions thereof to the tip portions thereof. Specifically, as shown in FIG. 6 and the like, the cross-section shapes of the tip portions 7a and the convex portions 8a are formed to be trapezoidal shapes. Alternatively, shapes other than the trapezoidal shape can be formed on condition that the joint portion width Lb, the circumferential width La, the root portion width Lc, and the circumferential width Ld are assumed to be substantially the same (i.e. La≈Lb≈Lc≈Ld). In the case, even when the tip portions 7a and the convex portions 8a are formed to be in shapes other than trapezoidal, cross sections of the flux path are substantially the same. Thus, magnetic saturation on the path of the magnetic flux $\phi$ can be suppressed, and a magnetic circuit having no needless magnetic paths can be formed, thereby improving the magnetic property (and also driving performance).

In the above embodiment, the tip portion 7a of the tooth 7 is formed to be a substantial trapezoidal shape. Thus, the circumferential width of a portion of the tooth 7 corresponding to the tip surface of the convex portions 8a is decreased, which forms a constricted shape (refer to FIG. 6 and the like). Alternatively, the tip portion 7a can be formed so as not to be the constricted shape as long as the expression described above (La≈Lb≈Lc≈Ld) is satisfied. Even when the tip portion 7a is formed as described above, magnetic saturation on the path of the magnetic flux $\phi$ can be suppressed, and a magnetic circuit having no needless magnetic paths can be formed, thereby improving the magnetic property (and also driving performance).

In the above embodiment, the coil 4 having a flattened shape widened in the circumferential direction is wound with aligned-distributed winding through the slot 9 so as to be aligned in line (refer to FIG. 13). Alternatively, when the circumferential width of the tip surface of the tip portion 7a or the convex portion 8a is increased, to the coil 4 having a flattened shape widened in the circumferential direction may be wound with aligned-distributed winding so as to be aligned in multiple lines (i.e. two lines or more). According to the configuration, the teeth 7 and the back yoke 8 are joined to each other in the circumferential direction more strongly at the joint surface due to the action of the spring back of each line of the wound coil 4, thereby reliably improving the magnetic property.

According to the embodiment described above, the rotating electric machine M is used as an electric compressor (electric motor) (refer to FIG. 16). Alternatively, the rotating electric machine may be an electric motor, which performs rotary driving, other than the electric compressor, a generator, a generator motor or the like. Even when another rotating electric machine is configured, the magnetic property becomes excellent due to the engagement between the teeth 7 and the back yoke 8, and the teeth 7 can be easily incorporated into the back yoke 8.

Hereinafter, aspects of the above-described embodiments will be summarized.

As an aspect of the embodiment, the stator for a rotating electric machine includes: a stator core including a plurality of slots, through which coils are wound, and a plurality of teeth, whose root portions are connected with a bridge, the slots and the teeth being alternately arranged; and a back yoke which is arranged at the outer-circumference side of the stator core, and which includes convex portions and the concave portions at the inner-circumference side thereof, the convex portions being partially inserted into the slots, and the concave portions receiving the teeth, wherein the teeth includes tip portions whose circumferential widths gradually become larger along a radial direction from the inside of the stator to the outside of the stator, the back yoke includes convex portions whose circumferential widths gradually become larger along the radial direction from the outside of the stator to the inside of the stator, and the tip portions and the convex portions have substantially the same shape so as to engage with each other, and the length (Lb) of a joint portion at which the tip portion and the convex portion are joined to each other, the circumferential width (La) of the tooth corresponding to a tip surface of the convex portion, the width (Lc) of the root portion of the tooth, and the circumferential width (Ld) of the convex portion corresponding to a bottom face of the concave portion are substantially the same.

According to the configuration, since the length of the joint portion (Lb), the circumferential width (La) of the tooth, the root portion width (Lc) of the tooth, and the circumferential width (Ld) of the convex portion are substantially the same, cross sections of a flux path (i.e. cross-sectional areas, cross-sectional shapes and the like through which the magnetic flux flows) are substantially the same. Thus, magnetic saturation on the path of the magnetic flux can be suppressed, and a magnetic circuit having no needless magnetic paths (e.g. iron) can be formed, thereby improving the magnetic property (and also driving performance). Note that the tip portion of the tooth and the convex portion can be formed in any shapes. For example, cross-sectional shapes of the tooth and the convex portion may be trapezoidal shapes.

In the stator, at least one of a first gap ($G_{R1}$) and a second gap ($G_{R2}$) is generated, the first gap ($G_{R1}$) indicating a radial distance between a tip surface of the tooth and the bottom face of the concave portion, and the second gap ($G_{R2}$) indicating a radial distance between the tip surface of the convex portion and a portion where the circumferential width of the tooth is maximized.

According to the configuration, even when the tip portion of the tooth or the convex portion of the back yoke is deformed when the tip portion and the convex portion are engaged with each other, a space for receiving the tip portion or the convex portion can be ensured. Thereby, the stator core can be easily incorporated. In addition, both the first gap ($G_{R1}$) and the second gap ($G_{R2}$) are gaps in the radial direction, and are not gaps in the circumferential direction. Thus, the decrease of the cross section of the magnetic path in the back yoke can be suppressed, thereby suppressing the degradation of the magnetic property.

In the stator, the coil has a shape widened and flattened in the circumferential direction, and is wound through the slots with aligned-distributed winding. According to the configuration, the teeth and the back yoke are joined to each other more strongly in the circumferential direction at the joint surface due to the action of the spring back of the coils (the force by which the coils are restoring to a state in which the coils are not wound), thereby improving the magnetic property.

In the stator, the circumferential width of the wound coil is larger than one half of the maximum width of the slot. According to the configuration, since the coil is aligned in the radial direction in line, the force of spring back can be efficiently utilized, thereby further improving the magnetic property.

In the stator, the slots are formed to be a tapered shape in which the widths thereof gradually become larger along the radial direction from the inside of the stator to the outside of the stator. According to the configuration, the coil can be easily wound, and friction between the coil and the stator core (specifically, the wall surface of the tooth) can be reduced. In addition, since the force of spring back can be efficiently utilized, the magnetic property is further improved.

As another aspect of the embodiment, the rotating electric machine includes the above stator. According to the configuration, the rotating electric machine can be provided which has excellent magnetic properties due to the engagement between the teeth and the back yoke, and in which the teeth can be easily incorporated into the back yoke. Note that the rotating electric machine corresponds to an electric motor, a generator, a generator motor or the like.

It will be appreciated that the present invention is not limited to the configurations described above, but any and all modifications, variations or equivalents, which may occur to those who are skilled in the art, should be considered to fail within the scope of the present invention.

What is claimed is:

1. A stator for a rotating electric machine, comprising:
   a stator core including a plurality of slots, through which coils are wound, and a plurality of teeth, whose root portions are connected with a bridge, the slots and the teeth being alternately arranged; and
   a back yoke which is arranged at the outer-circumference side of the stator core, the back yoke including convex portions and concave portions at an inner-circumference side thereof, the convex portions being partially inserted into the slots, and the concave portions receiving the teeth, wherein
   the teeth include tip portions whose widths in a circumferential direction of the stator core gradually become larger along a radial outward direction from the inside of the stator toward the outside of the stator, the convex portions of the back yoke have widths in said circumferential direction that gradually become larger along a radial inward direction from the outside of the stator toward the inside of the stator, and the tip portions of the teeth and the convex portions of the back yoke have substantially the same shape so as to engage with each other,
   the length of a joint portion at which the tip portion of the tooth and the convex portion are joined to each other, the circumferential width of the tooth corresponding to a tip surface of the convex portion, the circumferential width of the root portion of the tooth, and the circumferential width of the convex portion corresponding to a bottom face of the concave portion are substantially the same, and
   at least one of a first gap and a second gap is provided, the first gap being defined by a radial distance between a tip surface of the tooth and the bottom face of the concave portion, and the second gap being defined by a radial distance between the tip surface of the convex portion and a portion where the circumferential width of the tooth is maximized, and
   the coil is wound through the slots with aligned-distributed winding and, as disposed in the slots, has a non-circular shape that is flattened in the radial direction of the stator core and widened in the circumferential direction of the stator core.

2. The stator according to claim 1, wherein
   the circumferential width of the wound coil is larger than one half of the maximum width of the slot.

3. The stator according to claim 2, wherein
   the slots are formed to be a tapered shape in which the widths thereof gradually become larger along the radial direction from the inside of the stator to the outside of the stator.

4. A rotating electric machine comprising the stator according to claim 3.

* * * * *